United States Patent [19]

Zimmerman, Harry M.

[11] Patent Number: 4,687,232

[45] Date of Patent: Aug. 18, 1987

[54] PIPE SLIP JOINT SYSTEM

[76] Inventor: Zimmerman, Harry M., 5708 Baltimore Dr., #399, La Mesa, Calif. 92041

[21] Appl. No.: 912,696

[22] Filed: Sep. 29, 1986

Related U.S. Application Data

[63] Continuation of Ser. No. 814,580, Dec. 27, 1985, which is a continuation of Ser. No. 522,198, Aug. 11, 1983, abandoned.

[51] Int. Cl.⁴ .............................................. F16L 21/02
[52] U.S. Cl. ........................................ 285/31; 285/38; 285/302; 285/423
[58] Field of Search .................... 285/31, 302, 38, 423

[56] References Cited

U.S. PATENT DOCUMENTS

| | | | |
|---|---|---|---|
| 3,857,588 | 12/1974 | Curtin | 285/31 |
| 4,023,831 | 5/1977 | Thompson | 285/31 |
| 4,386,796 | 6/1983 | Lyall | 285/31 |

FOREIGN PATENT DOCUMENTS

| | | | |
|---|---|---|---|
| 237895 | 3/1962 | Australia | 285/302 |
| 867989 | 5/1961 | United Kingdom | 285/302 |

*Primary Examiner*—Dave W. Arola
*Attorney, Agent, or Firm*—James W. McClain; Stanley A. Becker

[57] ABSTRACT

An in-line pipe coupling comprising a joint housing which encloses a piston means having a standard diameter pipe section which protrudes from one end of the joint housing may be compressed and inserted into a small cutaway section of existing pipeline and then expanded to fit over the two free ends of pipe, forming a continuous water-tight connection. The slip joint may be utilized in conjunction with either a standard straight pipe coupling or a T-coupling or cross coupling in order to facilitate addition of one or more branch lines to an existing pipeline.

5 Claims, 11 Drawing Figures

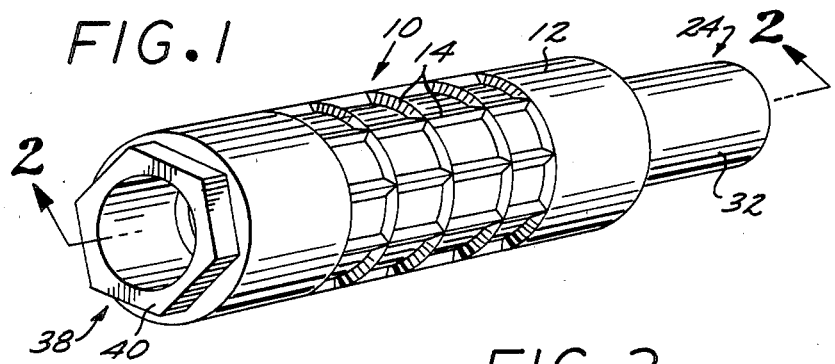
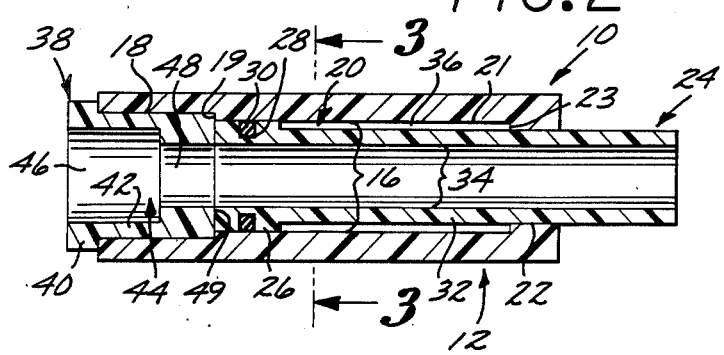
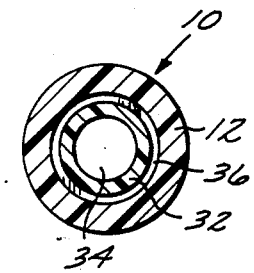
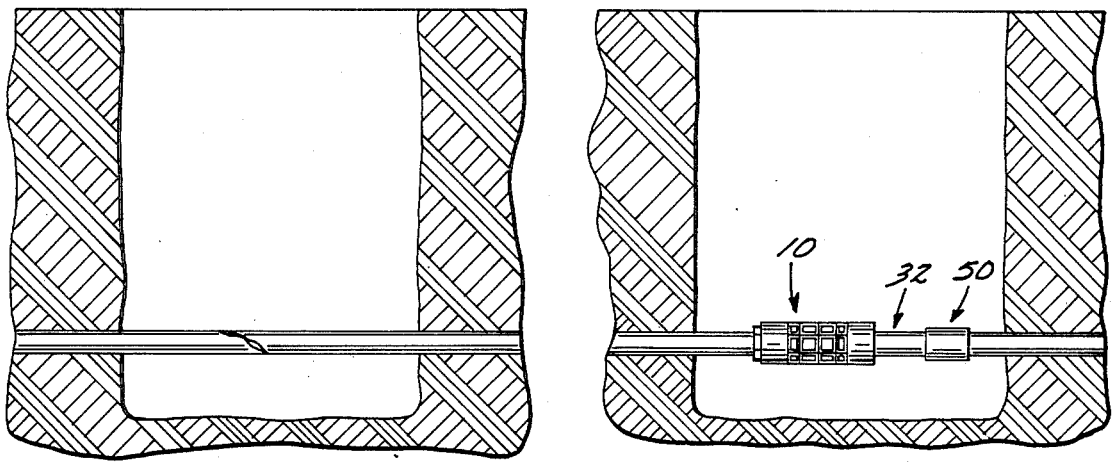
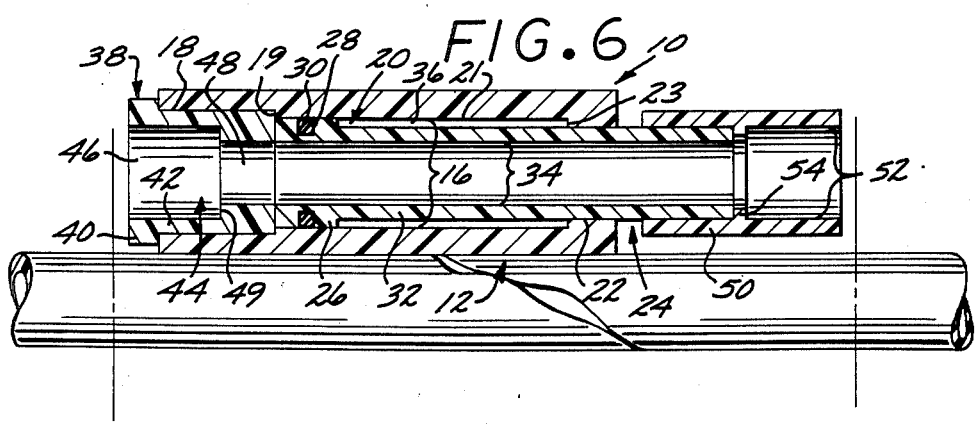

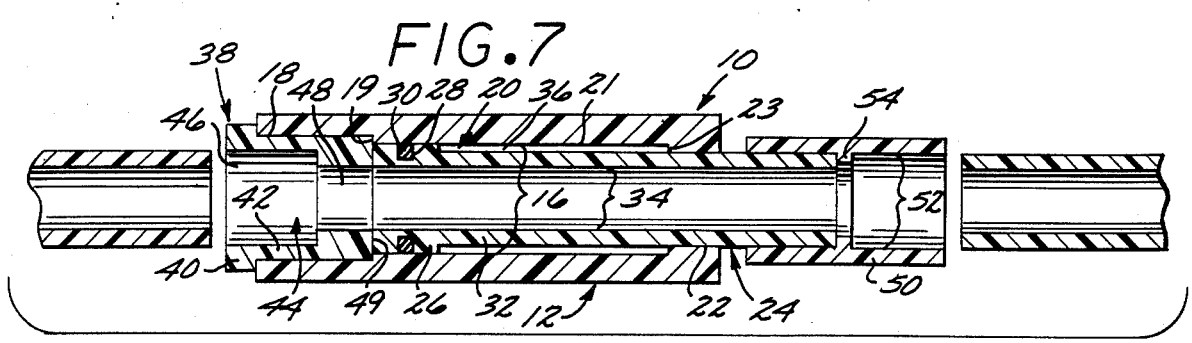
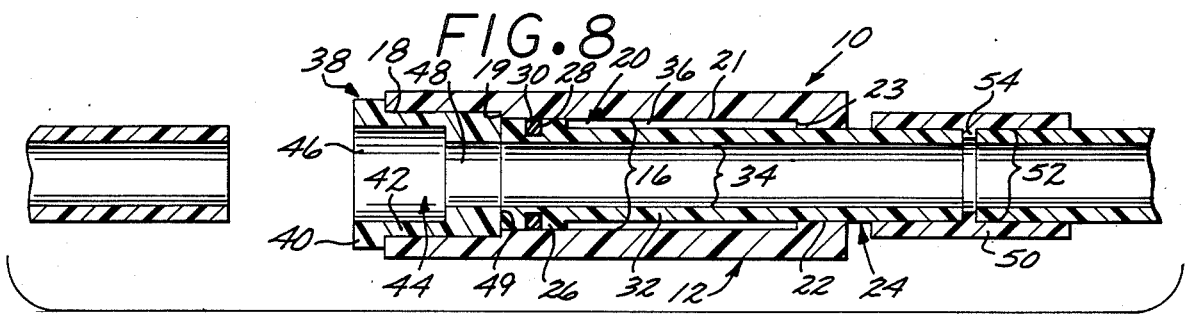
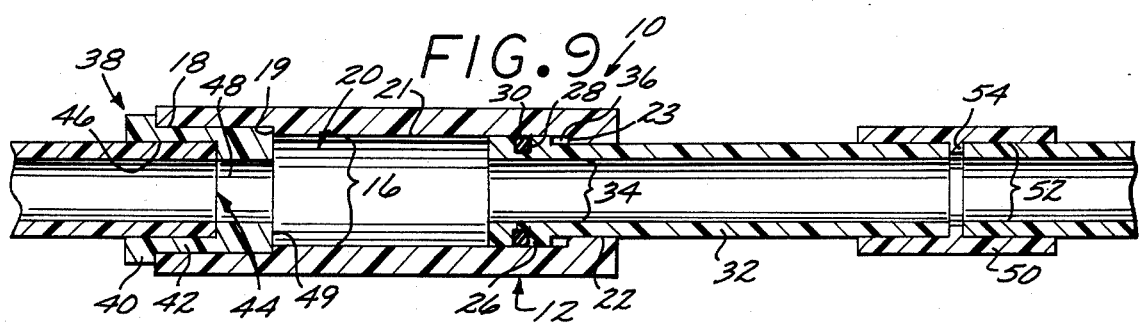
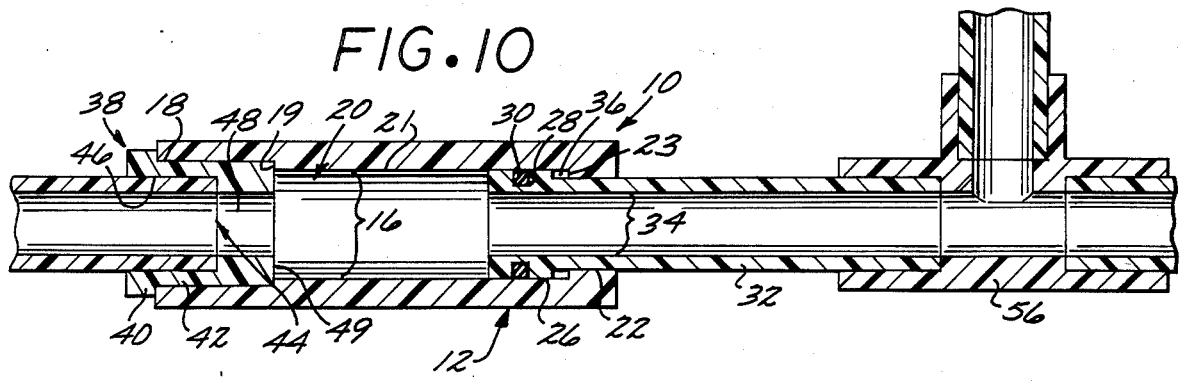
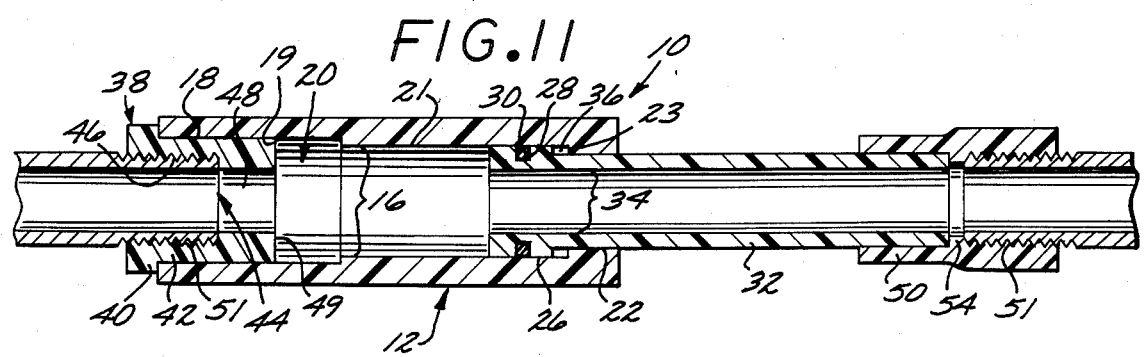

PIPE SLIP JOINT SYSTEM

This application is a continuation, of application Ser. No. 814,580, filed Dec. 27, 1985, which is a continuation of application Ser. No. 522,198, filed Aug. 11, 1983, now abandoned.

BACKGROUND OF THE INVENTION

1. Field of the Invention

The present invention relates to pipe couplings, and particularly to pipe repair couplings.

2. Description of the Prior Art

The mending of broken pipe, particularly underground pipe, has traditionally been a laborious and complicated procedure. For the repair of broken PVC (polyvinyl chloride) pipe, this procedure has traditionally comprised isolating the break and then excavating around or otherwise clearing a long section of the PVC pipe surrounding the break. A long section of pipe on both sides of the break is required because the standard repair coupling until now has comprised a short piece of similar PVC piping which is radially enlarged relative to the pipe to be repaired and which is slipped and solvent welded over the broken ends of pipe. This requires that the broken ends of pipe be relatively free in order to have enough play to be bent back so that the weld coupling may be inserted and then the broken ends of pipe cammed toward each other into the weld coupling. This method of bending and camming the pipe sections to be joined frequently results in an insertion of extra pipe length into the existing pipe line exerting additional flexural stresses upon the pipe line. This problem is exacerbated in the instance of PVC pipe having a large diameter since in order to gain the required flexibility, a much greater length of pipe must be cleared on either side of the break. The same difficulties pertain wherein an additional branch pipe is to be added to an existed line since the existing pipe must be cut and a T-coupling inserted in the manner described above.

In repairing non-PVC pipe, the process is much more complicated. Frequently the entire length of pipe which is broken must be removed and a new length of pipe, if it is compatible, must be replaced and sometimes forced into place to fit the existing threaded couplings. Otherwise, a torch cutting procedure must be employed and then a new length of pipe must be fitted and welded or otherwise heat fused into place.

In both of these instances, a collapsible repair coupling would be useful since only a small area of the pipe surrounding the break need be removed, the collapsible repair coupling fitted into place and then expanded to fit the free ends of pipe. The only pipe coupling device incorporating a collapsible configuration of which the applicant is aware is a PVC device which is solvent welded onto a PVC line and which has a lubricated extendable housing having a threaded attachment whereby the housing may be rotated in order to fit a water or other fluid source. The lubrication which allows for the expansion and compression of the device is exposed to environmental corruption and frequently sticks. This device is unsuitable for PVC repair work since corruption of the lubricated seal may foul the device and consequently the device must be protected by an outer plastic sheath or other cover.

Applicant is aware of no collapsible repair coupling or other collapsible coupling having entirely internal and nonfoulable means of extension.

SUMMARY OF THE INVENTION

In view of these and other problems in the art, it is a general object of the present invention to provide an easily attachable in-line pipe joint repair coupling.

It is another object of the present invention to provide an in-line pipe joint repair coupling which contributes little or no added flexural stress to the existing pipe line.

It is another object of the present invention to provide an in-line pipe joint coupling of the character described which eliminates the necessity of camming together two loose ends of existing pipe line.

Yet another object of the present invention is to provide an in-line pipe joint coupling of the character described, the insertion of which eliminates the necessity of excavating around or otherwise clearing away extensive portions of existing pipe line on either side of a pipe break.

A further object of the present invention is to provide an in-line pipe coupling of the character described wherein the pipe coupling comprises a slip joint which is collapsible by itself for insertion into a small cutaway section of existing pipe line and then expandable to facilitate the connection of the two free ends of pipe to be joined.

It is a further object of the present invention to provide an in-line pipe coupling of the character described wherein expansion and compression of the slip joint is provided for by a piston means which is entirely enclosed within the body of the slip joint in order to prevent environmental fouling of the piston mechanism.

A still further object of the present invention is to provide an in-line pipe coupling of the character described which facilitates the addition of a branch pipe to an existing pipe line.

Another object of the present invention is to provide an in-line pipe coupling of the character described wherein the piston means and joint housing may be twisted in either direction relative to each other in order to facilitate the connection of free pipe ends wherein one or both of the pipe ends to be connected require threaded engagement.

The present invention discloses a pipe slip joint coupling which comprises a water-tight piston pipe, the piston section of which is contained within a radially-enlarged joint housing. The protruding end of the piston pipe is compatible with the interior and exterior diameters of the piping which is to be joined, while the piston section of the piston pipe which is enclosed within the joint housing is radially expanded and held firmly in place against the piston cylinder walls by an O-ring such that a leakproof fluid conduit is formed at any point in the compression or expansion of the piston means. For the repair of a broken pipe line, the break is isolated by either excavation or otherwise clearing away the immediate area surrounding the break, cutting away a small section of pipe surrounding the break which is slightly longer than the compressed state of the slip joint of the present invention, slipping one end of the slip joint over one of the free pipe ends, and then expanding the slip joint to fit over the other free end of pipe to be connected. A branch line may be added to an existing pipe line by using the slip joint of the present invention in conjunction with a standard T-section coupling. Since the joint housing and piston pipe of the slip joint may be rotated in either direction relative to each other, the slip joint of the present invention is well adapted to joining sections of pipe wherein one or both of the free pipe ends to be connected requires threaded engagement.

These and other objects of the present invention will become clear in the following description as taken in conjunction with the drawings.

BRIEF DESCRIPTION OF THE DRAWINGS

FIG. 1 is a perspective view of the slip joint of the present invention.

FIG. 2 is a view taken in cross-section of a compressed assembly of the slip joint of the present invention.

FIG. 3 is a transverse cross-sectional view taken on line 3—3 in FIG. 2.

FIG. 4 is a view in elevation of the break in an underground pipe after the pipe break has been isolated by excavation around and above the pipe line.

FIG. 5 is a view in elevation of the pipe line illustrated in FIG. 4 after it has been repaired by the slip joint of the present invention.

FIG. 6 is a cross-sectional view of a compressed state of the slip joint of the present invention in conjunction with a standard pipe weld coupling, as shown in relation to an elevated view of a broken section of pipe; the figure indicates the lines along which the broken pipe section must be cut in order to begin repair of the pipe break by means of the slip joint of the present invention.

FIG. 7 is a cross-sectional view of a compressed state of the slip joint of the present invention in conjunction with a standard pipe weld coupling after it has been aligned between two free pipe ends to be connected.

FIG. 8 is a cross-sectional view of a compressed state of the slip joint of the present invention in conjunction with a standard pipe weld coupling after the pipe weld coupling has been slipped over one of two free ends of pipe to be connected by means of the slip joint of the present invention.

FIG. 9 shows a cross-sectional view of an expanded state of the slip joint of the present invention in conjunction with a standard weld coupling after the slip joint and weld coupling have been fitted in place over two free ends of pipe to be connected.

FIG. 10 shows a cross-sectional view of an expanded state of the slip joint of the present invention in conjunction with a standard T-coupling after the slip joint of the present invention has been inserted into an existing pipe line in order to facilitate addition of a branch line.

FIG. 11 shows a cross-sectional view of an expanded state of an alternative embodiment the present invention as it is adapted to accommodate the connection of pipe ends requiring threaded engagement.

DETAILED DESCRIPTION OF THE INVENTION

Referring to the drawings, and at first particularly to FIGS. 1 through 3, the slip joint of the present invention is generally designated 10 and is intended for use in joining two discrete ends of pipe, or for mending a single broken section of pipe. The present embodiment of the invention, as described herein, concerns itself primarily, although not by way of exclusion, with PVC (polyvinyl chloride) pipe. The joint housing 12 of the slip joint 10 is the outermost element of the slip joint 10, is preferably substantially cylindrical, and has an annular external cross ribbing 14 such that the joint housing 12 may be easily grasped and either rotated or longitudinally translated by hand. The joint housing 12 of the slip joint 10 has an axial bore 16 of varied radius defining, as illustrated in FIG. 2 and FIGS. 6–11, a bushing socket 18, a piston cylinder 20 and a pipe aperture 22.

A piston pipe 24 is substantially cylindrical and has at one of its longitudinal extremes a radially expanded piston section 26, the remainder of the piston pipe 24 defining a standard diameter pipe section 32. The pipe section 32 of the piston pipe 24 is substantially of the same external and internal diameter as the piping to be mended or joined by the slip joint 10. The piston pipe 24 is suitable for being inserted with the pipe section 32 first into the axial bore 16 of the joint housing 12, and indicated in FIG. 2. The radially-expanded piston section 26 of the piston pipe 24 has an annular slot 28 into which a lubricated O-ring 30 fits. When the piston pipe 24 is inserted into the axial bore 16 of the joint housing 12, a water-tight seal is formed between the O-ring 30 and the piston wall 21 of the axial bore 16 of the joint housing 12. The O-ring 30 is formed of an elastomeric material such that the radially-expanded piston section 26 of the piston pipe 24 may still traverse the piston cylinder 20 of the joint housing 12 without compromising the water-tightness of the fit between the O-ring 30 and the cylinder wall 21. An annular interspace 36 exists between the exterior of the pipe section 32 of the piston pipe 24 and the cylinder wall 21 of the piston cylinder 20. This annular interspace 36 diminishes in length and volume as the piston section 26 of the piston pipe 24 is drawn toward the piston stop 23 of the joint housing 12. The piston stop 23 is defined by the reduction of the axial bore 16 from the piston cylinder 20 to the pipe aperture 22. The slip joint 10 is said to be fully extended when the piston section 26 of the piston pipe 24 is seated against the piston stop 23 of the joint housing 12.

A reducer bushing 38 fits into the bushing socket 18 of the joint housing 12. The reducer bushing 38 is substantially cylindrical, having however an expanded, preferably hexagonal grip 40 which seats against the end of the joint housing 12 when the plug section 42 of the reducer bushing 38 is fully inserted within the bushing socket 18 of the joint housing 12. The reducer bushing 38 has a two-stage axial bore 44 which defines a pipe socket 46 and a radially reduced bore 48 of substantially the same internal diameter as that of the piping to be joined or mended by the slip joint 10.

The piston pipe 24 being first inserted as described with the pipe section 32 first through the bushing socket 18 and out the pipe aperture 22 such that the piston section 26 of the piston pipe 24 is contained within the piston cylinder 20, the plug section 42 of the reducer bushing 38 is inserted into the bushing socket 18 of the joint housing 12 such that the end of the reducer bushing 38 is preferably substantially flush against the bushing seat 19. This bushing seat 19 is defined by the reduction of the axial bore from the bushing socket 18 to the piston cylinder 20. Once assembled in this way, the slip joint 10 may be expanded or collapsed within well-defined limits. The plug section 42 of the reducer bushing 38 projects inwardly into the axial bore 16 of the joint housing 12 relative to the cylinder wall 21 of the piston cylinder 20 since the reduced bore 48 of the reducer bushing 38 is of a smaller diameter than the piston cylinder 20. The radial difference between the reduced bore 48 of the reducer bushing 38 and the piston cylinder 20 defines the extreme end of the plug section 42 of the reducer bushing 38 as a piston block 49, which limits the inward travel of the piston section 26 of the piston pipe 24 and consequently limits the collapse of the slip joint 10. Thus, as the fullest expansion of the slip joint 10 is defined by drawing the piston pipe 24 longitudinally outward so that its piston section 26 seats against the piston stop 23 of the joint housing 12 so the innermost collapse of the slip joint 10 is defined by pushing the piston pipe 24 longitudinally inward within the joint housing 12 such that the piston section 26 seats against the piston block 49 of the reducer bushing 38. In the normal use of the slip joint 10, the plug section 42 of the reducer bushing 38 is solvent welded within the bushing socket 18 of the joint housing 12 so that the reducer bushing 38, and in consequence, the piston block 49 are immobile relative to the joint housing 12, thereby permanently containing the movement of the piston section 26 within the piston cylinder 20.

The slip joint 10 of the present invention is utilized in conjunction with a standard radially-expanded pipe alignment weld coupling 50, as indicated in FIG. 5. FIG. 6 shows a cross-section of the slip joint 10 and the weld coupling 50 as they are conjunctively utilized. The axial bore 52 of the weld coupling 50 fits snugly over the longitudinal extreme of the pipe section 32 of the piston pipe 24 and also over one pipe end which is to be joined to another by means of the slip joint 10. The weld coupling 50 has proximate its longitudinal center an interior annular rib 54 which allows the pipe section 32 of the piston pipe 24 and the pipe end to which the piston pipe 24 is mated to be substantially centered along the length of the weld coupling 50 such that the piston pipe 24 and its mated pipe end may be substantially equally secured within the weld coupling 50.

FIGS. 4 and 5 illustrate a section of broken underground pipe where the break has been isolated by the excavation of a volume of earth around and above the broken section of pipe, and the same section of pipe after it has been mended by means of the slip joint 10 of the present invention. When repairing a section of broken pipe, as illustrated in FIGS. 4 and 6, the slip joint 10 is first fully assembled with the reducer bushing 38 solvent welded within the housing socket 18 and the weld coupling 50 solvent welded onto the longitudinal extreme of the pipe section 32 of the piston pipe 24. When the solvent welds have set and the broken section of pipe has been isolated, a section of pipe surrounding the break in the pipe to be mended which is preferably substantially one-quarter inch longer than the compressed assembly of the slip joint 10 is cut out of the pipe section. FIG. 6 shows a compressed assembly of the slip joint 10 in relation to a broken section of pipe to be mended and the lines along which the pipe section is to be cut. Figure 7 shows the pipe section having been cut out and the slip joint 10 having been aligned with the ends of pipe now to be joined. FIG. 8 illustrates the first step in attaching the slip joint 10 wherein the free end of the weld coupling 50 has been slipped over and solvent welded to one of the free ends of pipe. In FIG. 9, the mend has been completed by the expansion of the slip joint 10 such that the pipe socket 46 of the reducer bushing 38 has been slipped over and solvent welded to the remaining free end of pipe. A water-tight conduit has thereby been created which is actually flexurally more stable than the original pipe section. Fluid pressure within the slip joint 10 will now only serve to more forcibly expand the slip joint 10 in line with the existing pipe. Additionally, the slight remaining play of the piston section 26 within the piston cylinder 20 will allow the slip joint 10 to yield under flexural stress exerted by forces either under or above ground.

The piston section 26 of the piston pipe 24, the O-ring 30 and the piston cylinder 20 are all perfectly enclosed within the axial bore 16 of the joint housing 12. Since the pipe section 32 of the piston pipe 24 fits closely through the pipe aperture 22, the possibility of fouling the slip joint 10 by environmental corruption is substantially eliminated. The travel of the piston section 26 of the piston pipe 24, depending more on the elastomeric qualities of the O-ring 30 than on the fluidity of a lubricant, does not tend to stick at one point in the piston cylinder 20 or thereby compromise the manageability or functionality of the slip joint 10.

The slip joint 10 of the present invention is also useful for splitting fluid flow by adding a subsidiary line to an existing pipe. This may be accomplished, as illustrated in FIG. 10, by substituting a standard T-section coupling for the standard straight coupling illustrated above. The method of inserting the slip joint 10 of the present invention into the existing pipe line is identical to that described above with the exception that the T-joint coupling may be slightly longer than the standard straight coupling and consequently the section of existing pipeline to be removed will be that much longer.

In some instances it may occur that one or both ends of pipe to be joined require threaded attachment. FIG. 11 illustrates an embodiment of the slip joint 10 of the present invention wherein both ends of pipe to be joined are threaded. The basic configuration of the slip joint 10 is not affected by this circumstance, but a reducer bushing 39 and radially-expanded weld coupling 51 which are threadedly adapted are utilized. The slip joint 10 of the present invention is particularly adapted to instances where one or more pipe ends are threaded due to the fact that the piston pipe 24 and the joint housing 12 may be separately rotated so that the threaded bushing and/or threaded coupling 51 may be threaded over their respective pipe ends.

The embodiment illustrated in FIG. 11 has also been adapted with regard to the relation between the housing socket 18 and the piston cylinder 20. The bushing socket 18 has been extended farther into the axial bore 16 while the depth of the reducer bushing 38 has remained the same. Consequently, when the slip joint 10 is in a fully retracted state, the O-ring 30 around the piston section 26 does not compress against a cylinder wall 21. The advantage of this configuration is that the O-ring 30 remains uncompressed until the slip joint 10 has been functionally expanded into use, thereby avoiding the possibility of the O-ring 30 permanently setting into a compressed state during storage.

The slip joint 10 of the present invention allows for the joining of two ends of pipe or the mending of a single section of broken pipe without applying undue flexural stresses to the main pipe line. Since the piston cylinder 20 and related elements are entirely contained within the joint housing 12, the slip joint 10 is not easily fouled by environmental corruption. The slip joint 10 may also be used to add a branch pipe to an existing pipe line. Since the slip joint 10 adjusts internally to the longitudinal orientation of the pipe ends to be joined, a repair of jointure operation may take place along no more length of pipe than accommodates the expansion of the slip joint 10. The system of the present invention eliminates the necessity of precision cuts of existing pipeline and also extensive excavation around an underground pipe in order to achieve the flexibility necessary in standard pipe repair.

While the present invention has been described with reference to presently preferred embodiments, it is to be understood that alterations may be made by a person skilled in the art without departing from the scope and spirit of the invention as set forth in the appended claims.

I claim:

1. An expandable pipe coupling which comprises:

an elongated housing having first and second ends, said housing defining an elongated cylindrical bore therein;

a radially inwardly-directed annular flange on said housing proximate said second end, said flange defining a piston pipe aperture coaxial with and of smaller diameter than said cylindrical bore;

a tubular piston comprising an elongated piston pipe with a radially enlarged annular piston head proximate one end, said piston being axially telescopically mounted in said housing with said piston head slideably engaged in said cylindrical bore and said piston pipe slideably engaged in said flange aperture with said pipe projecting axially outwardly from said second end of said housing in all axial positions of said piston; and an annular reducer bushing rigidly attached to said housing proximate said first end, said reducer bushing being a separate structural part from said cylinder so as to enable the expandable pipe coupling to be assembled by insertion of said piston into said cylinder through said first end toward said second end prior to attachment of said reducer bushing to said cylinder;

the concentric interface between said piston head and said cylindrical bore defining a substantially fluid tight seal, and the attachment of said reducer bushing to said housing also defining a substantially fluid tight seal;

said reducer bushing defining the limit of travel of said piston toward said first end of said housing, and opposing annular shoulders on said piston head and said flange defining the limit of travel of said piston toward said second end of said housing;

said concentric interface between said piston head and said cylindrical bore comprising O-ring seal means mounted on said piston head;

said housing having annular groove means therein stepped radially outwardly from said cylindrical bore and in registry with said O-ring seal means when said piston is at its said limit of travel toward said first end of said housing so that said O-ring seal means is substantially uncompressed radially in such position of said piston.

2. An expandable pipe coupling as defined in claim 1, wherein said reducer bushing defines a pipe socket therein adapted for connection of a pipe to said expandable pipe coupling.

3. An expandable pipe coupling as defined in claim 1 wherein:

said cylindrical bore in said housing is in two axially abutting segments, one of which has a larger diameter than the other, with the smaller diameter segment extending axially inwardly from said second end and the larger diameter segment extending axially inwardly in from said first end;

said annular reducing bushing is attached to said housing by being inserted into said larger diameter segment of said bore;

the axial length of said larger diameter segment is greater than the coaxial length of that portion of said bushing which is inserted into said segment; and said annular groove means comprises that portion of said larger diameter segment which extends axially inwardly from the inward end of said bushing when said bushing is inserted into said larger diameter segment of said bore.

4. An expandable pipe coupling as defined in claim 1 wherein said housing, bushing and piston are all composed of polyvinyl chloride.

5. In an expandable pipe coupling which comprises an elongated housing with an axial bore therethrough, a tubular hollow piston having head means and being telescopically movable in said bore, flange means at a second axial end of said housing to retain said piston in said bore, an annular reducing bushing removably insertable into said bore at a first axial end of said housing to define the limit of travel with said flange means of said piston within said bore, and fluid-tight sealing means compressed the head of said piston and the inside wall of said bore; the improvement which comprises:

said axial bore having a greater diameter segment and a lesser diameter segment, the greater diameter segment extending axially inwardly from said first end a distance greater than the length of that portion of said bushing which inserts into said bore; and the portion of said greater diameter bore segment extending axially inwardly from the inner end of said bushing comprising an annular groove with which said sealing means registers when said piston is fully telescoped into said bore so that said sealing means is in a substantially uncompressed state when in registry with said groove.

* * * * *